3,325,439
STABILIZED SELF-EMULSIFYING SOLUTIONS OF ALKYL POLY-SILOXANES CONTAINING HYDROGEN LINKED WITH SILICON
Hans-Horst Steinbach, Leverkusen-Mathildenhof, Germany, assignor to Farbenfabriken Bayer Aktiengesellschaft, Leverkusen, Germany, a German corporation
No Drawing. Filed July 24, 1963, Ser. No. 297,215
Claims priority, application Germany, July 28, 1962, F 37,455
2 Claims. (Cl. 260—32.8)

The invention relates to an improvement of the known solutions of incompletely substituted alkyl polysiloxanes, i.e. which contain hydrogen linked with silicon, said solutions being self-emulsifying with water.

Solutions of this type consist, for example (cf. British patent specification No. 915,787), of the alkyl polysiloxane, an anhydrous though water-miscible solvent such as ethanol or propanol, and a fatty acid ester of polyglycols or polyhydroxy compounds with more than 3 OH groups or their etherification products with polyglycols. When poured into water, they yield, without special mechanical devices, emulsions which are immediately ready to be used for various known purposes, especially for impregnating fibre materials and dense surfaces against wetting by water. Compared with ready made emulsions, the advantage of these solutions is due to the sensitivity of the Si-H bond to hydrolysis which causes hydrogen to evolve from the emulsions upon storage so that the latter cannot be kept in closed vessels. With solutions, this disadvantage is largely obviated, but not always sufficiently, as has been found. It is difficult to prevent the solutions from taking up small amounts of water from the atmosphere during production and during decanting or drawing off, so that in summer, and particularly in the tropics, an inadmissable increase of pressure may already occur in closed dispatch containers.

It has now been found that this disadvantage can be avoided by the addition of small amounts of one of the solution components mentioned below. According to the invention therefore, solutions of alkyl polysiloxanes containing silicon-linked hydrogen, and of emulsifiers consisting of fatty acid esters of polyvalent hydroxyl compounds or acylamido alkyl sulphates, in lower alcohols or acetone, with an increased stability of the Si-H bonds, which spontaneously form with water emulsions suitable for impregnation purposes are produced by admixing a primary monobasic aminocarboxyl acid, or a hexamethylene tetramine, potassium biphthalate or sodium citrate, in an amount lying between $10^{-5}$ percent by weight of the solution and the saturation concentration. In particular, as the most effective of these additives glycocoll may be mentioned, which should be added in an amount of between 0.1 and 10 mg. per each kg. of solution. The saturation concentration strongly depends upon the water content of the solvent. Normally, 3 mg. of glycocoll are added to every kg. of solution, and the whole mixture is stirred for 2 hours. This small addition does not impair the self-emulsifying properties.

As a further primary monobasic aminocarboxylic acid there may be mentioned 6-aminocaproic acid. The other afore-mentioned additives are less advantageous because, in order to achieve a sufficient stabilising effect, they require a higher concentration which appreciably reduces the self-emulsifying power of the solution. The following table summarises a number of measurement results which were obtained with a solution of the following composition:

25 percent by weight of polysiloxane oil of the formula

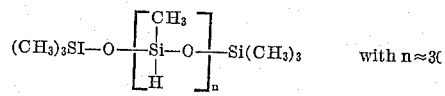

1 percent by weight of polyoxyethylene-sorbitol hexaoleate
74 percent by weight of isopropyl alcohol 100 cc. each of this solution were saturated with the additives listed in the table, and then stirred at 40° C. for 48 hours, whereby the amounts of hydrogen given in the table evolved.

|  | Cc. |
|---|---|
| Solution without additive | 75 |
| With glycocoll | 2 |
| With 6-aminocaproic acid | 4 |
| With hexamethylene tetramine | 2 |
| With potassium biphthalate | 5 |
| With sodium citrate | 10 |
| With glutamic acid for comparison | 82 |

It could be shown by experiment that the reduction in the evolution of hydrogen which can be achieved according to the invention by the addition of glycocoll, can also be obtained when the solvent is previously thoroughly dried. Dehydration to less than $5.10^{-4}$ percent by weight was attained, for example, by allowing isopropyl alcohol to flow in a current of 5 litres per hour through a tube of 26 mm. diameter and 1.5 m. length charged with zeolite 4 A. However, the reduction in the dissociation of hydrogen in a solution prepared with such an isopropyl alcohol lasted only while the solution remained sealed off from the atmosphere. After access of air, the effect of the drying treatment was again lost, whereas the technically much more convenient addition of glycocoll has a permanent effect.

In practice, the alkyl polysiloxanes containing Si-H bonds are frequently treated with sodium carbonate or sodium bicarbonate, in order to remove any Si-Cl bonds still present from their production by hydrolysis of chlorosilanes. It is advisable to omit this treatment when using the polysiloxanes for the solutions according to the invention, since it has proved to be of no advantage at all, but even to reduce the effect of the glycocoll.

The following examples are given for the purpose of illustrating the invention.

*Example 1*

In order to produce the siloxane component of the solution according to the invention, 3.6 mol of monomethyl dichlorosilane are mixed in known manner with 0.2 mol of trimethyl chlorosilane, and about 100 cc. of water are added dropwise to this mixture at temperatures below 10° C. The oily phase thus obtained is washed several times with water and freed from the low-boiling constituents at 150° C. under vacuum.

250 g. of polysiloxane thus obtained and 10 g. of the hexaoleate of a polyethoxylated sorbitol, as marketed Atlas Goldschmidt under the trade name G 1086, are dissolved in 740 g. of isopropyl alcohol. 3 mg. of glycocoll are added to this solution and the mixture is stirred for hours. From the solution thus obtained, as from the own solutions without addition of glycocoll, an emulsion can be prepared in a very simple manner by pouring into water and briefly stirring.

In order to test the solution under severe conditions, portions of 100 cc. thereof were stirred at 40° C. for 180 hours, in several experiments. The volume of escaping hydrogen amounted to 1.7 to 5 cc. during the first 48 hours, thereafter to 0.8 cc. within every 10 hours.

From a control solution without the addition of glycocoll, but otherwise completely equal composition, there evolved, under the same conditions, 80 cc. of hydrogen during the first 48 hours, and then 23 cc. during every 10 hours.

Example 2

250 g. of a polysiloxane obtained according to the method used in Example 1, from 3 mol of monomethyl chlorosilane and 2 mol of trimethyl chlorosilane, and g. of mono-(β-stearoyl-amidoethyl) sulphate, as marketed by Atlas Goldschmidt under the trade name G 3578, are dissolved in 743 g. of acetone. To this solution are added 3 mg. of glycocoll, and the mixture is stirred for hours.

Testing of 100 cc. of the solution under the conditions described in Example 1, yielded 2 cc. of gas in 48 hours. The control solution without glycocoll evolved 11 cc. of hydrogen in 48 hours.

What is claimed is:

1. Self-emulsifying solutions of alkyl polysiloxanes containing silicon-linked hydrogen, and of emulsifiers selected from the group consisting of a fatty acid ester of a polyhydroxy compound of more than 3 OH groups or their etherification products and acylamino alkyl sulphates, in a solvent selected from the group consisting of lower alcohols and acetone, which solutions contain as an Si-H bond stabilizing additive a member selected from the group consisting of a primary monobasic aminocarboxylic acid, hexamethylene tetramine, potassium biphthalate and sodium citrate, in an amount of between $10^{-5}$ percent by weight of the solution and the saturation concentration.

2. Solution according to claim 1, wherein the said additive is glycocoll in an amount of between 0.1 and 10 mg. per kg. of solution.

References Cited
FOREIGN PATENTS

| | | |
|---|---|---|
| 1,273,580 | 9/1961 | France. |
| 697,240 | 9/1953 | Great Britain. |

MORRIS LIEBMAN, *Primary Examiner.*

J. H. DERRINGTON, *Assistant Examiner.*

UNITED STATES PATENT OFFICE
CERTIFICATE OF CORRECTION

Patent No. 3,325,439                                June 13, 1967

Hans-Horst Steinbach

It is hereby certified that error appears in the above numbered patent requiring correction and that the said Letters Patent should read as corrected below.

Column 2, line 14, for "alcohol" read -- alcohol. --;
    column 4, line 8, for "acylamino" read -- acylamido --.

Signed and sealed this 26th day of December 1967.

(SEAL)
Attest:

Edward M. Fletcher, Jr.                          EDWARD J. BRENNER
Attesting Officer                                  Commissioner of Patents